June 12, 1962

G. P. BOSOMWORTH 3,038,524

APPARATUS AND METHOD OF BUILDING TIRES

Filed Feb. 12, 1959

June 12, 1962
G. P. BOSOMWORTH
3,038,524
APPARATUS AND METHOD OF BUILDING TIRES
Filed Feb. 12, 1959
4 Sheets-Sheet 3
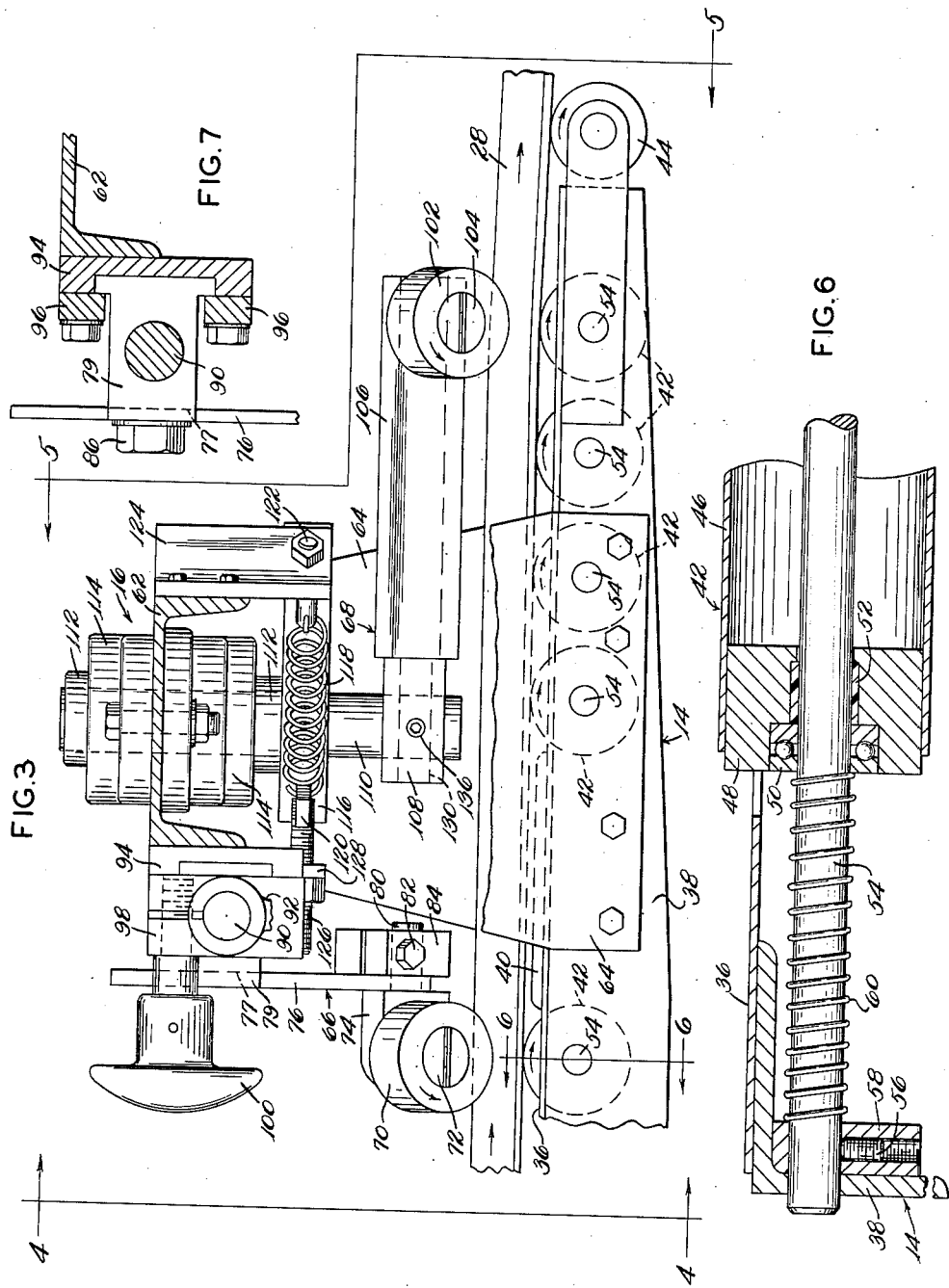

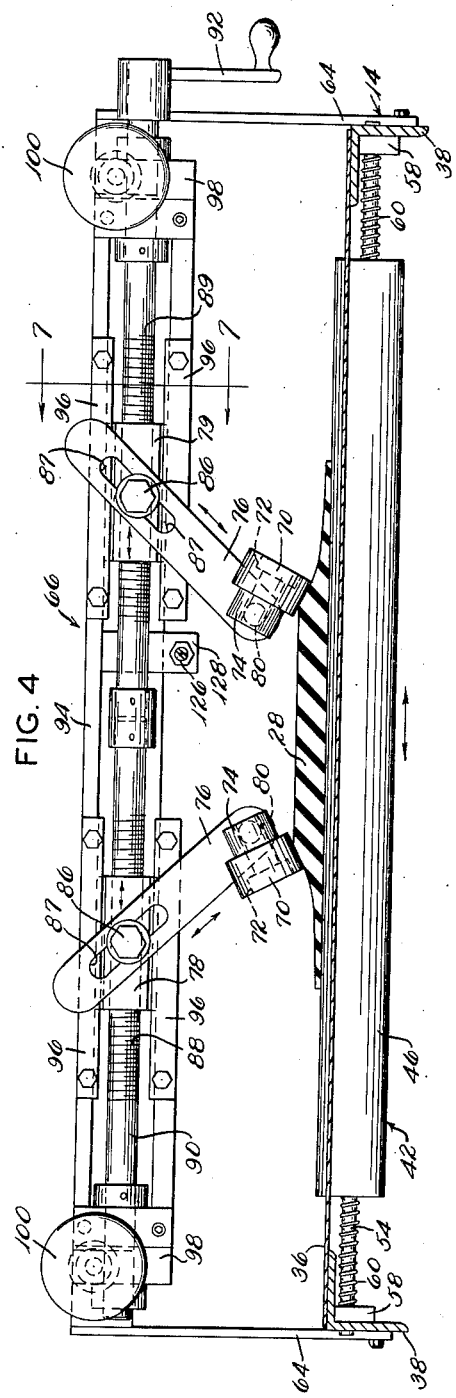

3,038,524
APPARATUS AND METHOD OF BUILDING TIRES
George P. Bosomworth, Akron, Ohio, assignor to The Firestone Tire & Rubber Company, Akron, Ohio, a corporation of Ohio
Filed Feb. 12, 1959, Ser. No. 792,831
3 Claims. (Cl. 156—405)

This invention relates to guide means and more particularly to an improved apparatus for aligning tire treads with respect to cylindrical tire bands upon which they are supplied during the construction of tires.

In a conventional method for building a tire, successive rubberized fabric plies are adhered to each other to form a band centered on a cylindrical tire building drum. One end of a tread is centered on and adhered to the completed band, and the drum is slowly turned to pull the tread from a supporting tray so that it can be adhered to the band to form a tire.

Off-center alignment of the tread with respect to the band creates an unbalance in the finished tire which results in unsatisfactory riding and wearing qualities.

The tread tray of conventional tire building apparatus usually comprises a sheet metal member which supports the tread. A guide is mounted above the tray and centered with respect to the drum to align the tread with respect to the band as the tread is pulled from the tray.

Such a combination of a tread tray with a guide is not entirely satisfactory for various reasons including the inability of the guide to compensate for random variations in tread width and the sluggish response of the tread to corrective forces as a result of friction between it and the tray.

The present invention accurately aligns a tread as it is applied to a tire band by means of novel arrangement of apparatus including a plurality of tread-supporting rollers cooperating with a self compensating guide which keeps the tread accurately centered on the band notwithstanding random variation in tread width. A plurality of laterally-movable rollers are provided which cooperate with the other elements to effect tread alignment in response to corrective forces applied to the tread by the guide. Other novel arrangements of apparatus to be described cooperate to attain the objects of the invention.

Accordingly, it is the general object of the invention to provide improved means for accurately applying a tread to a tire band on a tire building drum.

A more specific object is to provide means for accurately centering a tread with respect to a tire band on a building drum as the tread is pulled from a supporting tray and adhered to the band.

Another object is to provide in a tire building apparatus a tread support capable of lateral movement in response to corrective forces applied to the supported tread.

Yet another object is to provide in a tire building apparatus a guide which accurately aligns a tread with respect to a band regardless of random tread width variation within an allowable range. These and other objects and advantages will appear from the following description of a preferred form of the invention, reference being had to the accompanying drawings in which:

FIG. 3 is a side elevation taken along line 3—3 of FIG. 2, partially broken away and in section;

FIG. 4 is an end view taken along line 4—4 of FIG. 3 of the tread-receiving end of the apparatus of the invention;

FIG. 5 is an end view taken along the line 5—5 of FIG. 3 of the tread-dispensing end of the apparatus of the invention;

FIG. 6 is an enlarged fragmentary sectional view of one of the tread supporting rolls, taken along line 6—6 of FIG. 3;

FIG. 7 is an enlarged fragmentary sectional view taken on line 7—7 of FIG. 4.

Figure 1:
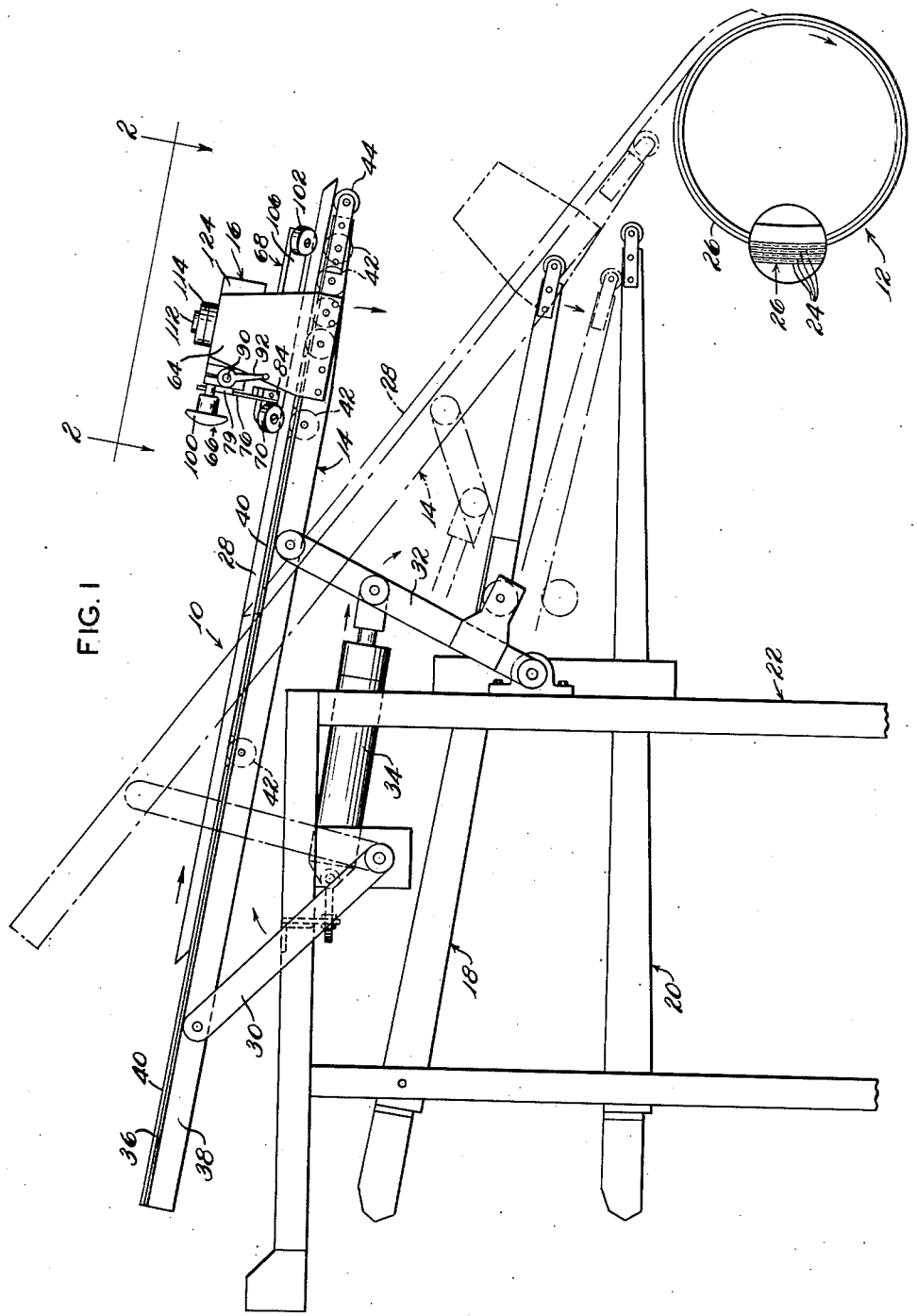
FIG. 1 is a side elevation of the apparatus of the invention.

Referring to FIGURE 1, a stock server, indicated generally at 10, is shown adjacent a conventional tire building drum 12.

The essential elements of the stock server are a tread tray assembly, indicated generally at 14, mounting a novel guide assembly to be described, indicated generally at 16, and fabric ply tray assemblies 18 and 20 mounted on a frame 22.

Conventionally, rubberized fabric is fed from trays 18 and 20 to drum 12 where it is formed into a series of concentric fabric plies 24 which together constitute a tire band 26. The assembly of a pneumatic tire is completed by encircling the band with a tread fed to the drum from tray 14. Tray 14, shown supporting one such tread 28, is pivotally mounted on frame 22 by arms 30 and 32 so that the tread, when needed, can be moved conveniently adjacent the drum at the position indicated by the dotted lines by means of a fluid pressure cylinder 34 pivotally mounted on frame 22.

Referring to the drawings generally, tread tray assembly 14 includes a metal sheet 36 fastened to two supporting angle irons 38. Tread 28 is supported on the tray by a plurality of longitudinal ribs 40 (FIG. 2) of semicircular cross section secured to sheet 36 and by a series of rollers 42 rotatably mounted on the angle irons 38 and extending through suitable openings in sheet 36. As it is removed from the tray, tread 28 is additionally supported by a breakover roller 44 rotatably secured to angle irons 38.

In view of the invention, each roller 42 as best shown in FIGURE 6, comprises a tube 46 carrying in each end a bearing block 48 which holds in suitable recesses a thrust bearing 50 and a sleeve bearing 52 of nylon or other antifriction material.

By means of bearings 50 and 52, rollers 42 are rotatably and slidably mounted on fixed shafts 54 which are held at each end by a screw 56 in a supporting block 58 affixed to angle iron 38. Springs 60 space the ends of the rollers from adjacent blocks 58 and keep the rollers in neutral positions centered on the shafts (FIGURES 4 and 6).

Figure 2:
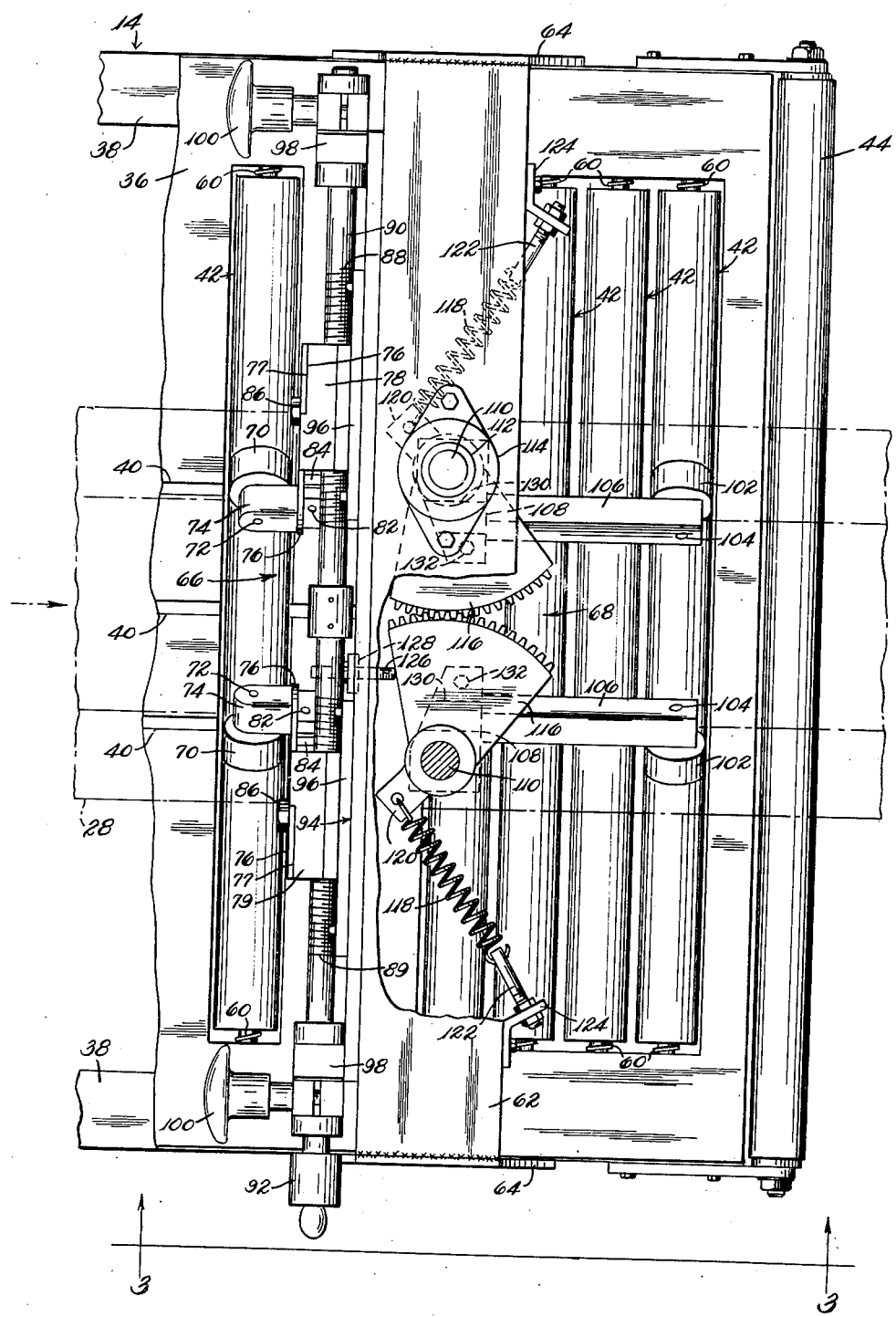
FIG. 2 is an enlarged fragmentary plan view taken along line 2—2 of FIG. 1.

As best shown in FIGURES 2 and 3, guide assembly 16 is mounted on a channel iron 62 welded at each end to a bracket 64 secured to angle irons 38 of the tread tray. Guide 16 consists of a tread-guiding subassembly, indicated generally at 66 (FIG. 4), which keeps a tread approximately centered with respect to drum 12 and another tread-guiding subassembly, indicated generally at 68 (FIG. 5), which receives the approximately-centered tread and accurately aligns it.

Referring to FIGURES 2, 3, and 4, subassembly 66 includes a pair of tread guiding rollers 70, rotatably secured by screws 72 to arms 74 pivotally held by second arms 76 adjustably mounted in grooves 77 (FIG. 3) in slide blocks 78 and 79. Rollers 70 are pivoted with respect to arms 76 by cylindrical ends 80 on arms 74 which are locked by screws 82 closing split blocks 84 secured to arms 76. Arms 76 are locked to slide blocks 78 and 79 by screws 86 extending through clearance slots 87.

Slide block 78 has a longitudinal bore with a right-hand thread, and slide block 79 has a bore with a left-hand thread. Blocks 78 and 79 engage mating threads 88 and 89 of corresponding hand on a shaft 90 which, when turned by means of crank 92, moves the blocks in opposite directions along a track 94 while keeping them always equidistant from the centerline of tray 14. Blocks 78 and 79 are confined within track 94 (FIG. 7) and prevented from turning about shaft 90 by means of keeper bars 96 (FIG. 4). Two split blocks 98, one secured to each end of track 94, serve as bearings for shaft 90 and, in conjunction with knob screws 100, as clamps to lock the shaft.

Referring to FIGURES 2, 3, and 5, subassembly 68 includes a pair of tread-guiding rollers 102 each rotatably secured by a screw 104 to an arm 106 pivotally held by a second arm 108 slidably mounted on a cantilevered stub shaft 110 pivotally suspended by means of collars 112 from two bearings 114 mounted on channel iron 62. Each shaft 110 carries one of two meshing gear sectors 116 secured thereto between arm 108 and bearing 114. Rollers 102 are each held against tread 28 by a spring 118 attached at one end to a bell crank 120 integral with gear sector 116 (FIG. 2) and at the other end to a tension adjusting rod 122 slidably mounted in a bracket 124 secured to channel iron 62. An adjustable stop screw 126, threaded into a lug 128 secured to track 94 of subassembly 66, bears against the edge of one gear sector and thus limits the travel of rollers 102 toward the centerline of tray 14. Roller 102 is pivoted with respect to arm 108 by a cylindrical end 130 on arm 106 which turns in a suitable bore in arm 108 and which may be locked by screw 132 closing a split portion 134 of arm 108. Arm 108 is secured to shaft 110 by a set screw 136.

Before the invention can be used to guide treads of a particular size and configuration, the tread guiding rollers 70 and 102 must be adjusted to contact the inclined portions, or shoulders, of the tread, as shown in FIGURES 4 and 5. Each roller 70 is pivoted by means of the cylindrical end 80 on arm 74 until the inclination of the roller matches that of the shoulder and the roller is then locked in position by screw 82 (FIG. 3) clamping end 80 in split block 84. Rollers 70 are adjusted vertically by sliding arms 76 in grooves 77 of slide blocks 78 and 79 and locking the arms to the blocks by means of screws 86. Rollers 102 are similarly adjusted and locked in position by means of equivalent apparatus previously described.

Since the distance between the tread shoulders normally varies within certain allowable manufacturing limits, rollers 70 must be spaced at the maximum limit to insure that all treads within the tolerance will move freely between them. Rollers 70 are spaced by rotating crank 92 and are locked in position by means of knob screws 100.

In contradistinction to the fixed spacing of rollers 70, rollers 102 are free to pivot with stub shafts 110 in bearings 114, and springs 118 keep them in contact with the tread in spite of variations in the distance between the shoulders. No spacing adjustment is required for rollers 102 except to limit their travel inward toward the centerline of the tray so that the treads may be easily pulled between them. The inward travel of the rollers is limited by stop screw 126 which is adjusted to space them at a distance less than the lowest allowable spacing between the tread shoulders.

To adjust subassembly 68 a tread is aligned between rollers 102, the tension in each spring 118 is adjusted until the rollers bear equally on the respective shoulders of the tread with sufficient force to prevent off-center treads from moving the rollers apart and out of contact with one of the shoulders. This force, however, is not so great that it prevents the rollers from pivoting about the respective shafts 110 in response to variation in shoulder spacing. With the spring tension properly adjusted, the rollers not only keep a tread centered between them in spite of shoulder variation but also function as fulcrums to effect tread alignment.

In operation, after the foregoing adjustments have been made, a tread is placed on the tread tray and pulled under rollers 70 and 102 as shown in FIGURE 1. When, during the building of a tire, a tire band 26 has been assembled in the conventional manner, centered on drum 12, cylinder 34 is actuated to pivot tray 14 to the position indicated by the dotted lines. The end of the tread is pulled from the tray and centrally adhered to the tire band. Then drum 12 is slowly turned through one revolution to encircle the band with the tread as it is pulled from the tray.

If, as the tread is pulled from the tray, the tread centerline lies entirely within the reference plane which includes both the centerline of the tray and the transverse centerline of the drum, no lateral correction of the tread will be required and the guide rollers will exert only small forces which are equal and opposite and which cause no lateral movement of the tread.

If, however, in some portion of the tread, the centerline does not lie within the reference plane, that portion of the tread will be askew as it approaches rollers 70 and will bear against the roller on the side to which it deviates. The roller will act as a fulcrum and will translate components of the pulling force into reaction forces which bear on the tread shoulder and tend to move the tread laterally into alignment. If the distance between the tread shoulders is the maximum allowable and therebefore equal to the spacing between the rollers 70, the tread will be correctly aligned as it passes through the rollers. If, however, the distance between the shoulders is less than the maximum allowable, the tread will be in contact with only the roller which acts as the fulcrum and the tread will be off-center by the difference between the roller spacing and the distance between the shoulders.

When the tread having a shoulder spacing equal to the maximum allowable moves from rollers 70 to rollers 102, it requires no correction and therebefore no reaction forces are exerted by rollers 102.

On the other hand, when the tread is off-center as it approaches rollers 102, it bears against the roller on the side to which it deviates and that roller acts as a fulcrum and exerts corrective lateral forces on the tread. In addition, springs 118 act to move the rollers 102 toward each other, and to keep them in contact with the tread shoulders. Gear sectors 116 keep rollers 102 equidistant from the tray centerline at all times and translate the movement of one roller into an equivalent movement of the other. The combined effect of the two actions is to move the tread laterally as both rollers 102 exert forces upon the shoulders until the lateral components of the forces involved are equal and opposite when the tread is centered on the tray.

While the rollers act as fulcrums, the tread, being flexible, does not act as a true lever. Therefore, the lateral corrective movement does not occur along the entire length of the tread as would be the case if it were rigid. Most of the lateral movement of the tread takes place a short distance from the rollers. Since the tread does not act as a true lever and because of the inherent stickiness of unvulcanized rubber with respect to the tray, the lateral displacement of the off-center tread is difficult.

It was found that this difficulty could be overcome by providing rollers 42, which, in addition to being rotatable, are slidable along shafts 54 against springs 60. Although the reaction forces exerted on the tread by rollers 102 are small because the misalignment of the tread is small after being approximately aligned by rollers 70, these forces, combined with the forces exerted by springs 118, are sufficient to easily overcome the resistance offered by springs 60 to the sliding of rollers 42. This resistance is small for the function of springs 60 is merely to return rollers 42 to their neutral positions by overcoming the low friction of sleeve bearings 52.

Various changes may be made in the apparatus without departing from the scope of the invention. For example, the preferred apparatus may be modified by eliminating subassembly 66. The remaining structure, comprising mainly subassembly 68 and the supporting rollers 42, functions as a useful tread guide having a tread-alignment accuracy which, although less than that of the preferred apparatus, is greater than that of conventional guides.

Also, while the peripheral surface of a guide roller is shown as being cylindrical, it can also be frusto-conical, or even curved if that is necessary to match the contour of the tread surface which it contacts.

These and other changes may be made in the apparatus without departing from the scope of the invention as defined by the following claims.

What is claimed is:

1. Apparatus for accurately applying a tire tread, having shoulder portions of variable lateral spacing, to a tire body supported on a drum, comprising support means for said tread adjacent said drum, means to feed said tread from said support means onto said tire body, and aligning means acting upon said tread while it is on said support means, said aligning means comprising laterally spaced apart rollers engaging, respectively, said shoulder portions, resilient means continuously urging said rollers against said shoulder portions but yieldable to permit said rollers to move laterally together and apart to accommodate variations in the lateral spacing of said shoulder portions, and means linking said rollers in a manner to provide simultaneous and equal lateral movements of said rollers toward and away from each other.

2. Apparatus for accurately applying a tire tread, having shoulder portions of variable lateral spacing, to a tire body supported on a drum, comprising support means for said tread adjacent said drum, means to feed said tread from said support means onto said tire body, and aligning means acting upon said tread while it is on said support means, said support means being laterally movable in response to lateral movement of said tread in contact therewith, and said aligning means comprising laterally spaced apart rollers engaging, respectively, said shoulder portions, resilient means continuously urging said rollers against said shoulder portions but yieldable to permit said rollers to move laterally together and apart to accommodate variations in the lateral spacing of said shoulder portions, and means linking said rollers and permitting only simultaneous and equal lateral movements of said rollers toward and away from each other.

3. Apparatus for accurately applying a tire tread, having shoulder portions of variable lateral spacing, to a tire body supported on a drum, comprising support means for said tread adjacent said drum, means to feed said tread from said support means onto said tire body, and aligning means acting upon said tread while it is on said support means, said aligning means comprising laterally spaced apart members engaging, respectively, said shoulder portions, resilient means continuously urging said spaced apart members against said shoulder portions but yieldable to permit said spaced apart members to move laterally together and apart to accommodate variations in the lateral spacing of said shoulder portions, and means linking said spaced apart members in a manner to provide simultaneous and equal lateral movements of said spaced apart members toward and away from each other.

References Cited in the file of this patent

UNITED STATES PATENTS

| | | |
|---|---|---|
| Re. 16,498 | Harsel | Dec. 7, 1926 |
| 1,159,840 | Hermann | Nov. 9, 1915 |
| 1,255,320 | Knight | Feb. 5, 1918 |
| 1,266,364 | Wheeler | May 14, 1918 |
| 1,872,830 | Shook | Aug. 23, 1932 |
| 2,346,439 | Leguillon | Apr. 11, 1944 |
| 2,671,495 | Iredell | Mar. 9, 1954 |
| 2,690,785 | McWilliams | Oct. 5, 1956 |